No. 887,839. PATENTED MAY 19, 1908.
W. L. PATTERSON.
DISSOLVING ATTACHMENT FOR PROJECTION APPARATUS.
APPLICATION FILED JAN. 28, 1907.
3 SHEETS—SHEET 1.
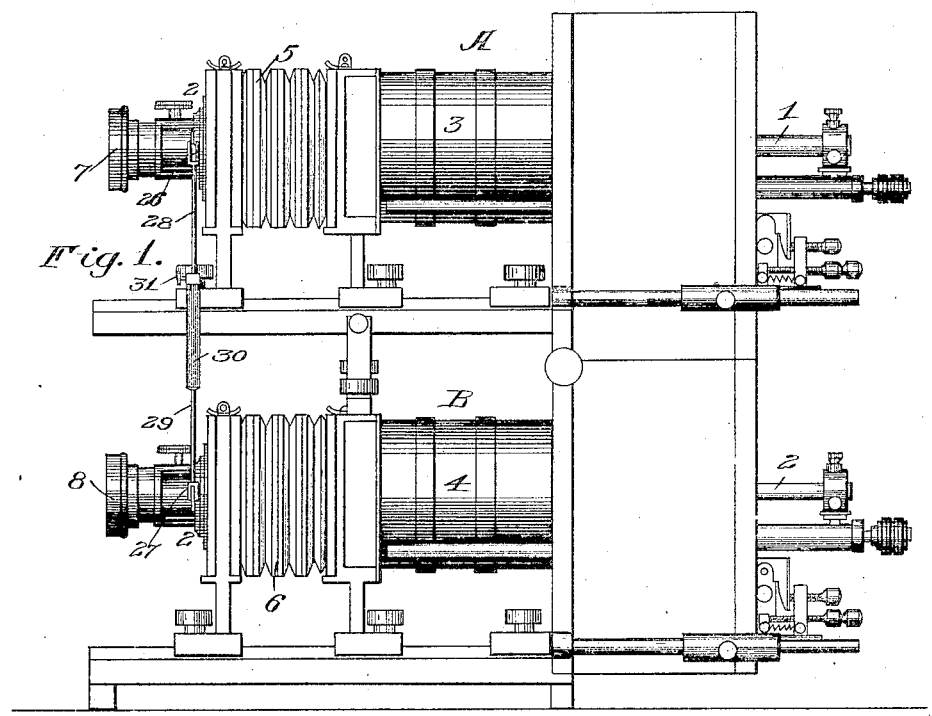
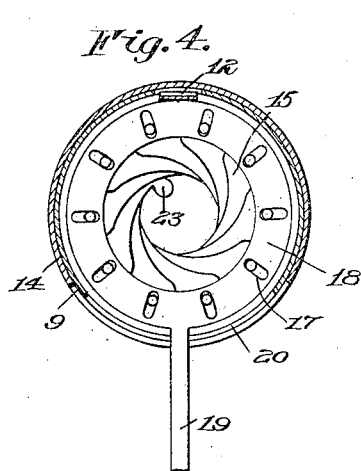
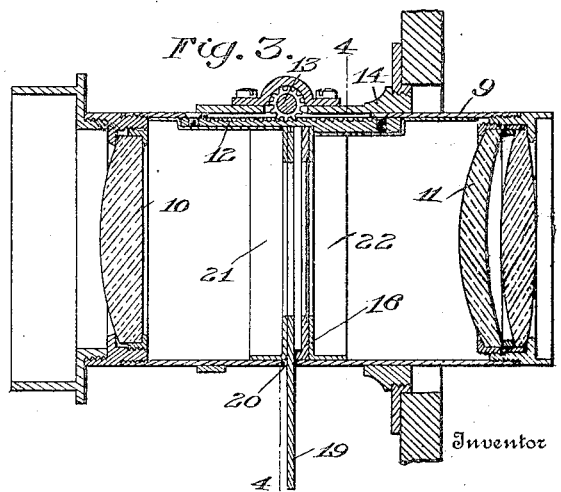
Witnesses
Walter B. Payne.
Charles A. Bateman.
Inventor
William L. Patterson
By Church & Rich
his Attorneys

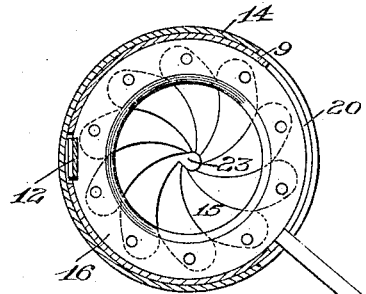
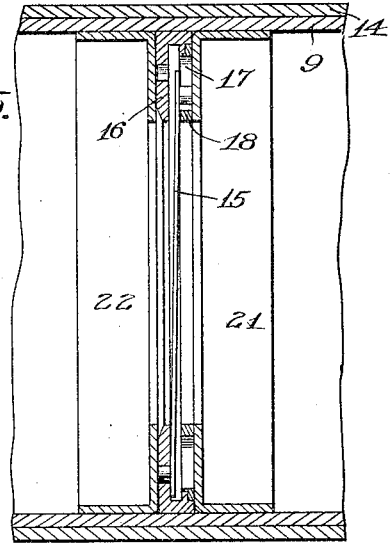
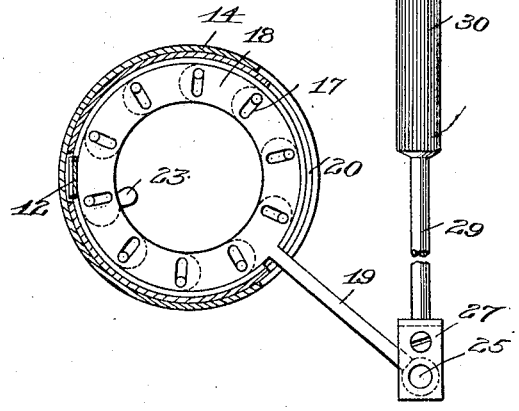
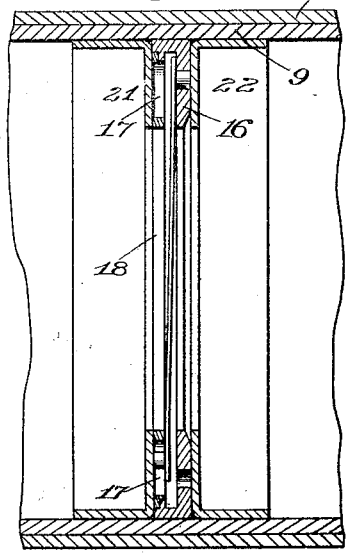

No. 887,839. PATENTED MAY 19, 1908.
W. L. PATTERSON.
DISSOLVING ATTACHMENT FOR PROJECTION APPARATUS.
APPLICATION FILED JAN. 28, 1907.
3 SHEETS—SHEET 3.
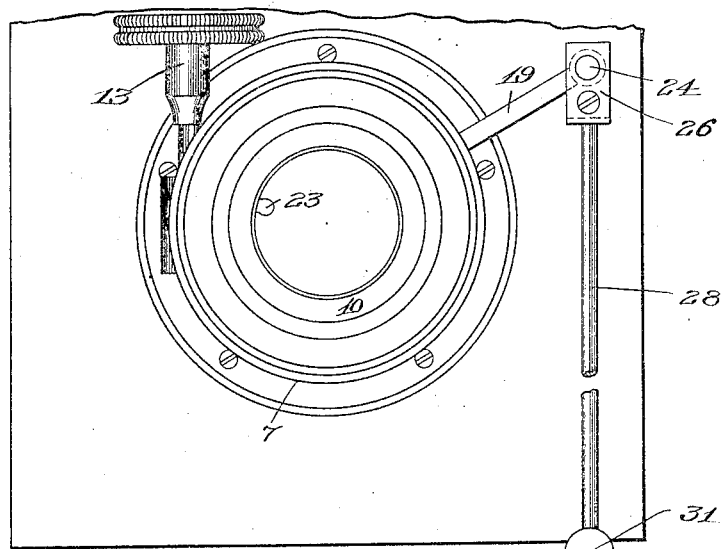
Fig. 8.
Fig. 7.
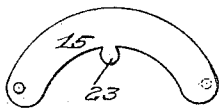
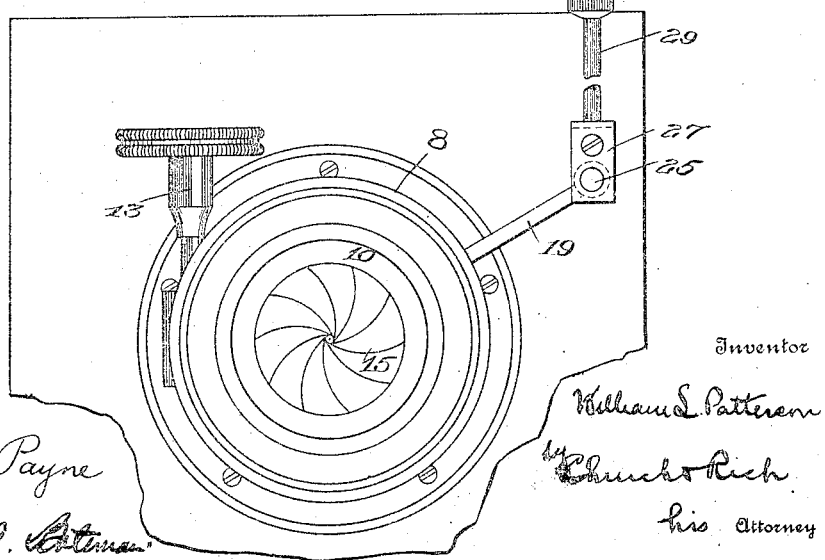
Witnesses
Walter B. Payne
Clarence A. Bateman
Inventor
William L. Patterson
by Chuck Rich
his Attorney

UNITED STATES PATENT OFFICE.

WILLIAM L. PATTERSON, OF ROCHESTER, NEW YORK, ASSIGNOR, BY MESNE ASSIGNMENTS, TO BAUSCH & LOMB OPTICAL COMPANY, OF ROCHESTER, NEW YORK, A CORPORATION OF NEW YORK.

DISSOLVING ATTACHMENT FOR PROJECTION APPARATUS.

No. 887,839.  Specification of Letters Patent.  Patented May 19, 1908.

Application filed January 28, 1907. Serial No. 354,409.

*To all whom it may concern:*

Be it known that I, WILLIAM L. PATTERSON, of Rochester, in the county of Monroe and State of New York, have invented certain new and useful Improvements in Dissolving Attachments for Projection Apparatus; and I do hereby declare the following to be a full, clear, and exact description of the same, reference being had to the accompanying drawings, forming a part of the specification, and to the reference-numerals marked thereon.

My present invention relates to improvements in diaphragm regulating or adjusting devices, and more especially to those applied to projection apparatus employing two lanterns, each provided with an adjustable diaphragm, and a diaphragm adjusting device serving to so adjust the diaphragms relatively to one another that the image projected upon the screen by one lantern will gradually disappear or dissolve while another image supersedes it on the screen.

To these and other ends the invention consists in certain improvements and combinations and arrangements of parts all as will be hereinafter more fully described, the novel features being pointed out in the claims at the end of the specification.

In the accompanying drawings: Figure 1 represents a side elevation of a projection apparatus, provided with a dissolving attachment constructed in accordance with my present invention. Fig. 2 represents an elevation on the line 2—2 of Fig. 1. Fig. 3 represents a longitudinal section of one of the lenses. Fig. 4 represents a transverse section of the lens mount on the line 4—4 of Fig. 3. Figs. 5 and 6 are sectional views of the respective diaphragms, and Fig. 7 is a detail view of one of the diaphragm leaves removed from the diaphragm. Fig. 8 is a view of the diaphragms in front elevation, the diaphragms being in reverse arrangement from that shown in Fig. 2.

Similar reference numerals in the several figures indicate similar parts.

In operating projection apparatus it is frequently desirable to project successively a series of pictures on the screen and produce a dissolving effect of the pictures or images on the screen without altering materially the definition of the images, and this is accomplished according to the present invention by providing each lantern or projection lens with an iris diaphragm, and so connecting the operating parts of these diaphragms that while one of them closes or reduces the size of its aperture, the aperture of the other diaphragm will be correspondingly increased in size, so that the total amount of light cast upon the screen from both lenses will not be materially altered during the transition from one image to another.

It will be understood, of course, that the present invention may be adapted to optical apparatus of various types, the apparatus shown in the present instance embodying generally a pair of suitably arranged lanterns A and B, provided with the lamps 1 and 2, the condensing systems 3 and 4, and the extensible bellows 5 and 6 for enabling the projection lens to be roughly focused relatively to the respective condensing systems. To the front board of each of the extensible bellows are attached the lenses 7 and 8, both of which are directed upon the same screen. These lenses are mounted in suitable lens mounts, and the latter contain diaphragms preferably of the iris type and are substantially duplicates, except that in the present instance a rotation of the adjusting ring of one diaphragm serves to open the leaves, while the movement in the same direction of the other diaphragm serves to close the leaves thereof, and the operating portions of these rings are suitably connected for simultaneous operation by an operating member, which may be conveniently manipulated by the operator to obtain the desired effects on the screen.

The lens mounts in the present instance are practically duplicates embodying generally a lens tube 9 provided with the anterior and posterior lens combinations 10 and 11 and having a rack 12 thereon arranged to coöperate with a pinion 13, mounted on a supporting or guiding tube 14 within which the lens tube is axially adjustable, and this adjustment permits a fine focusing of the projection lens relatively to the screen. Within the lens tube is mounted a diaphragm, the latter being preferably arranged intermediate the anterior and posterior lens elements, and it is preferably of the iris type employing a plurality of interfolded leaves 15, each of which is provided at one end with a projection adapted to coöperate with a radial slot in a relatively fixed ring 16 secured in the lens tube, and a projection at the opposite end of each blade rests in a radial slot 17 formed in an adjusting ring 18, the latter being rotatable about the axis of the lens tube and having an operating portion 19 extending through a circumferential slot 20 in the lens tube, the relatively fixed and adjustable rings of the diaphragm being held in place by sleeves 21 and 22 suitably secured in the lens tube.

One or more of the diaphragm leaves is provided with an inwardly extending covering portion 23 located intermediate the points of attachment of the blade to the diaphragm rings, and so arranged that when the blades are moved to closed position this covering portion will coincide with or cover the opening that would otherwise be left uncovered.

The arrangement of the diaphragms between the anterior and the posterior lens combinations of the projection device throws them at distances from the objects to be projected substantially equal to the conjugate focal lengths of the projection devices. In this manner when the diaphragms or other equivalent shutter devices are operated, the light on all portions of both projected images is reduced or increased at the same ratio, thus giving all portions of the images the same brilliancy.

The operating arms 19 of the diaphragms are provided on their free ends with spherical heads 24 and 25, adapted to coöperate with the yokes 26 and 27, the latter having oppositely arranged seats or apertures in their arms to engage these spherical heads at opposite sides and thus provide a universal connection between them and the rods 28 and 29, the latter rod being provided with a handle portion 30 which is hollow to form a telescopic fit with the rod 28 and these rods are held in adjusted relation by a set screw 31 on the handle 30.

An arrangement of the kind described insures a substantially uniform closing of one diaphragm in relation to the corresponding opening movement of the other diaphragm, so that the illumination from the two lenses will remain substantially constant during the transition from one image to another, and the connecting device, by reason of its universal connection with the operating portions of the diaphragms permits independent focusing movement of the different lenses without altering the relation between the diaphragms, and this relation may be adjusted by means of the set screw 31 which permits lengthening or shortening of the operating member which connects the diaphragms.

The improved closing device for the diaphragm may also be applied to iris diaphragms generally in cases where it is necessary or desirable to totally cut off light therefrom, and it is especially advantageous when applied to projection apparatus as it insures perfect definition of the image, and enables this result to be accomplished with the iris form of diaphragm which usually gives results superior to those of any other form of diaphragm as applied to projection apparatus.

I claim as my invention:

1. In projection apparatus, the combination with a pair of projecting lanterns, of an adjustable diaphragm for each lantern located a distance from the object to be projected substantially equal to the conjugate focal length of the projection lens, and devices connecting the diaphragms for insuring an opening movement of one and a closing movement of the other.

2. In projection apparatus, the combination with a pair of projecting lanterns, of diaphragms for the lanterns located at distances from the objects to be projected subtantially equal to the conjugate focal lengths of the projection lenses, and each having an adjusting portion arranged to move in the same direction to open one diaphragm and close the other, and an operating member connecting the adjusting portions of the two diaphragms.

3. In projection apparatus, the combination with a pair of projecting lenses, of an iris diaphragm for each lens, each diaphragm having an adjusting ring rotatable in the same direction for opening one diaphragm and closing the other, and an operating member connected to the adjusting rings for causing operation thereof in the same direction.

4. In projection apparatus, the combination with a pair of projecting lanterns, of a diaphragm for each lantern having an adjusting arm for opening and closing it, and an operating member connected to the adjusting arms of the diaphragms and adjustable longitudinally to alter the relative adjustment of the diaphragms.

5. In projection apparatus, the combination with a pair of lanterns and a projecting lens for each lantern each having its own axial adjusting portion for focusing, of a diaphragm for each lens carried by the adjustable portion thereof and each diaphragm having an adjusting arm, and an operating member having universal connections with the diaphragm adjusting arms for effecting simultaneous adjustment thereof and to permit independent focusing of the lenses.

6. In projection apparatus, the combination with a pair of projecting lanterns, of a diaphragm for each lantern having an operating arm for opening and closing it, rods attached one to each diaphragm, operating arm, one of said rods being adjustable longitudinally relatively to the other, and means for fixing said rods in fixed adjusted relation.

7. In projection apparatus, the combination with a pair of projecting lanterns and lenses therefor adjustable axially for focusing purposes, of a diaphragm carried by each lens having an operating arm provided with a spherical head, and a connecting member having a suitably seated yoke on each end adapted to coöperate with the head of the respective diaphragms.

8. In a projecting apparatus, the combination with a pair of projecting lanterns and a projection device for each lantern, each embodying anterior and posterior lens combinations, of an iris diaphragm arranged between the anterior and the posterior lens of each projection device and devices connecting the diaphragms for insuring a closing of one during the opening of the other.

9. In a projection apparatus, the combination with a pair of projecting lanterns each having a projecting lens, of a pair of adjustable devices to reduce or increase the light on all portions of the images at the same ratio, located at distances from the objects to be projected by the apparatus, substantially equal to the conjugate local lengths of projection lenses, and connection between said devices for insuring the opening of one with the closing of the other.

WILLIAM L. PATTERSON.

Witnesses:
 CLARENCE A. BATEMAN
 ELIZABETH I. ALDRICH.